United States Patent [19]

Koch et al.

[11] 4,410,165

[45] Oct. 18, 1983

[54] BALL VALVE AND SEAT ASSEMBLY

[75] Inventors: Ulrich H. Koch, Bainbridge Township, Cuyahoga County; Peter C. Williams, Cleveland Hts., both of Ohio

[73] Assignee: Whitey Co., Highland Hts., Ohio

[21] Appl. No.: 348,718

[22] Filed: Feb. 16, 1982

[51] Int. Cl.³ ............................................ F16K 25/00
[52] U.S. Cl. .................................. 251/174; 251/172; 251/315; 251/317
[58] Field of Search ................ 251/172, 174, 315, 317

[56] References Cited

U.S. PATENT DOCUMENTS

| | | | |
|---|---|---|---|
| 3,371,907 | 3/1968 | Scaramucci | 251/172 X |
| 3,477,691 | 11/1969 | Griswold | 251/174 X |
| 3,570,811 | 3/1971 | Kruschick | 251/174 X |
| 3,598,363 | 8/1971 | Shaw | 251/172 |
| 3,894,718 | 7/1975 | Koch | 251/174 X |

FOREIGN PATENT DOCUMENTS 1427882  1/1966  France ................ 251/172

*Primary Examiner*—Harold W. Weakley

*Attorney, Agent, or Firm*—Fay & Sharpe

[57] ABSTRACT

A ball valve having an improved relationship between the ball and associated seat rings and an improved seat ring design. The ball is mounted for selective rotation and limited axial movement in a valve body passageway. Seat rings disposed on diametrically opposite sides of the ball about valve inlet and outlet openings each include a ball engaging surface having an arcuate contour. At a relaxed preassembly reference position, the radius of curvature of the ball engaging surface is greater than the radius of curvature of the ball. Frustoconical disc springs interposed between each seat ring and an associated valve body shoulder additionally urge the seat rings into engagement with the ball. A reinforcing ring disposed at the forward end of each seat ring acts as a rigid bearing surface. Component sizing is such that in the assembled valve, the seat rings are slightly rotatably flexed in response to the engaging surfaces thereof engaging the ball such that the surfaces are distorted to have a mating relationship with the ball. At the same time, the disc springs are compressed while continuously urging the seat ring ball engaging surfaces into ball engagement.

20 Claims, 10 Drawing Figures

BALL VALVE AND SEAT ASSEMBLY

BACKGROUND OF THE INVENTION

This invention relates to the valve art, and, more particularly, to ball valves.

The invention is particularly applicable to a new and improved ball valve and seat assembly for a valve of the type having a so-called "floating ball" and will be described with particular reference thereto. However, it will become readily apparent to those skilled in the art that the invention is capable of broader applications and could be adapted for use in other types and styles of valves.

Ball valve constructions in commercial use typically employ annular seats or seat rings formed of a resilient and deformable plastic for sealing engagement with the ball. A pair of such seat rings are positioned adjacent inlet and outlet openings. The ball itself is mounted for a slight amount of free movement or shifting axially of the seat when the ball is in a valve closed position under fluid pressure conditions. Such shifting causes the ball to act against and flex the downstream seat ring to enhance its sealing engagement with the ball. The amount of such flexing varies in accordance with the fluid pressure involved.

The floating ball concept has been successfully used in many arrangements and designs for small ball valves, and for lower pressure ball valves. As fluid pressure increases and causes downstream shifting of the ball, the ball is moved away from the upstream seat and all the force is applied to the downstream seat. Since the seat comprises an annulus of a smaller area, seat stress is always greater than the fluid pressure. In addition, as the valve size itself increases, the ball force increases as a function of the square of the seal diameter. However, typically it is impractical to increase the annular seat area at the same rate. Therefore, in a large valve or at high pressure, the seat stress can reach levels that may crush ordinary plastic type seats.

An overall objective of ball valve seat designs is to obtain a valve which will seal at both low pressure and high pressure and that will not require an unreasonable amount of operating torque for rotating the ball member. The floating ball type of concept is particularly advantageous in that it facilitates elimination of the more expensive trunnion mounted type of ball member as well as more complex pressure actuated valve seats.

Various forms and types of ball valve seat designs have heretofore been suggested and employed in the industry, all with varying degrees of success. It has been found that the defects present in most prior ball valve seat designs are such that the devices themselves are of limited economic and practical value.

Prior ball valves employing an elementary seat have included a seat design typically comprised of annular resilient plastic seats merely compacted between the ball member and opposed end fittings. The ball engaging surface of each seat includes a contour which matably engages the ball member periphery upon compacting assembly.

Elementary seat designs suffer from a number of inherent problems. In a valve closed position, the upstream pressure on the ball member forces the ball member into engagement with the downstream seat to seal the valve in a virtual check valve type action. Since the pressure on the ball member is substantially responsible for all the sealing force, at low pressure or vacuum conditions, a low sealing force is present and results in a leaking valve with leak paths between the seats and ball and between the outer surfaces of the seats and supporting flanges or shoulders of the opposed end fittings. Elementary seat designs provide no compensation for wear or tolerance errors in the annular seats and thus associated leakage problems are compounded over a period of time.

At conditions where the upstream seat seals against the ball member, the additional surface area of the upstream seat receiving load pressure is imparted against the downstream seat thereby increasing the load upon the downstream seat resulting in increased downstream seat stress and distortion. The force on the upstream seat to its outer diameter surface is translated through the ball member to the downstream seat. Such increased load area results in increased seat stress and thus causes an undesirable wear rate for the downstream seat. The problems of increased seat stress and wear are particularly noticeable on the larger ball valve sizes.

Also at conditions including upstream seat sealing against the ball member at a valve closed position, a problem occurs with a "blowing-in" bulge on the upstream seat at the first opening of the valve. As the valve is being opened, the upstream seat must momentarily span the opening or fluid passage extending through the ball and hold back fluid pressure. During this short period of time until the upstream seat seal is relieved by further opening of the valve, the portion of the seat spanning the fluid passage can deform into the passage under fluid pressure. With a small opening in the ball, the seat is quite rigid when loaded as a beam in bending and can easily bridge the gap. As the valve size and ball opening increase, the section modulus of the seat does not proportionately increase to retain the same stiffness. Thus, the seat may deflect and deform further into the ball opening to form a bulge in that sector of the seat ring.

As repetitive cycling occurs throughout the life of the valve, the bulge in the upstream seat becomes more pronounced and actually operates to cam a floating ball against the downstream seat as the ball member is rotated to the valve open position. The resulting camming action further stresses, even cutting, the downstream seat, and may ultimately distort and wear the seat into a non-operative condition. The bulge on the inlet seat cams the ball off-center and holds it away from both seats while closed causing seat leakage in the closed position. It is particularly noteworthy that the industry focused on the downstream seat assembly for purposes of later improving ball valve operation to prevent valve failures and problems caused by blowing-in bulges. In actuality, however, the upstream seat design was the cause of the problem. The upstream seat permitted the blowing-in bulge and the resultant camming action which was reflected to the downstream seat.

Where soft plastic seats are employed, such as those made of Teflon, particular problems encountered with cold flow creep in the seat at non-contained portions aggravate wear and undesirable seat deformation.

Blowing-in bulge aside, a sealing upstream seat has a generally unsupported annular front face that can creep in toward the center of the valve when the valve is closed and under long duration static fluid pressure drop across the upstream seat. In the elementary seat design the outside diameter of the seat ring is normally supported only by a shoulder in the valve body. The area of the seat and, therefore, the force acting on it, increases as the square of the diameter. Since the supporting shoulder is usually quite narrow and its area is more closely related to the seat circumference, the supporting shoulder width only increases in a linear fashion. This results in a narrow supporting shoulder which allows the seat to shear past it. Ultimately as the seat creeps forward it can cave-in entirely or before that point it typically curls into the orifice of the ball such that when the valve is operated, the seat is torn. This problem also becomes more pronounced as the valve size increases.

The down stream seat can also creep in toward the center of the valve by its generally unsupported annular front face. When the valve is in the closed position, the seat may be displaced upstream by the ball member pushing into it under pressure load.

Where large ball members are employed in large valves, the ball member weight additionally contributes to the deformation and cold flow problems. As the seats deform after a period of use the ball member may sag to the bottom of the valve, thereby providing a clearance at the top of the valve for a leak path.

An evolutionary step beyond the foregoing elementary seat design is the contoured seat in which the ball engaging surface of the seat includes a contour different from that of the ball member outer periphery. The objective of this contoured design is to obtain a narrow band or line contact between the seat and the ball which flexes slightly under loads and retains contact with the ball at low pressure situations to give a sealing stress at low pressure to minimize leakage between the ball member and seat. However, in addition to retaining the other problems associated with the elementary seat design, the contoured seat suffers from the additional problems of extreme contact line distortion in high pressure conditions and rapid wear due to high seat stress since the entire sealing force was substantially borne by the contact line band. The extreme distortion and rapid wear further aggravated the other problems.

In order to overcome the particular wear problems of contoured seat designs, the flexible seat design, as is illustrated in U.S. Pat. No. 2,945,666 evolved. The spring action of the flexible seat provided low pressure contact, wear compensation, tolerance compensation and ball sag compensation. However, this design suffers from the particular problem of providing improved operation for only a short period of time.

The seat is typically constructed of a plastic material which lacks an elastic memory and which deflects under load but does not return to its original shape when the load is removed. In addition, the flexible seat design employs less seat material at the contact line with the ball. After short periods of exposure to high pressure, the flexible seat will distort to the shape of an elementary seat which is severely worn.

The problems of creep at non-contained portions of both upstream and downstream seats, high downstream seat load due to an upstream seat seal, seat-to-shoulder leak paths, and seat blowing-in bulges all remain with both the flexible seat design and the contoured seat design.

The industry next developed a ball valve seat design comprised of a seat having a seat ring with a metal frusto-conical disc spring disposed in operative engagement with the seat ring rear face. The disc spring allows for improved compensation for seat ring wear, distortion and creep as well as seat tolerance and ball sag, while providing an elastic support which effects a low pressure force bias. The disc spring provides seat elasticity not dependent on the elastic memory of the plastic seat material. However, while this is an improvement over the before-mentioned flexible seat design, the disc spring must, nevertheless, provide its elastic force while overcoming the elastic resistance of the plastic seat material.

A particular problem with this design is that the action of the spring assures that the upstream seat seals against the ball member. Thus, the problem of the elementary seat design having an effective load area on the downstream seat substantially equal to the surface of the upstream seat is not mitigated. The remaining unsolved problems include a blowing-in bulge, a weak seal at the seat-to-support shoulder contact area and creep on the non-contained portions of both the upstream and downstream seat rings. In addition, a problem with such design is that the disc spring need overcome the elasticity of the seat ring to effect the low pressure force bias.

In order to meet the problems caused by an upstream or inlet sealing seat, the industry developed an upstream seat bypass arrangement such as is typically illustrated in U.S. Pat. No. 2,930,576. Various upstream seat bypass methods and designs are employed including seat notches, grooves, holes, body orifices, and check valves. These variations are all for the purpose of communicating line pressure around the upstream seat at the valve closed position for relieving the upstream seat ring, for reducing the load area by which the ball member imparts a load on the downstream seat, and thus for reducing seat stress, creep and wear at the downstream seat ring. Also upstream seat blow-in and creep under static pressure is circumvented. In addition, the necessary operating torque for opening and closing the valve is lessened.

Particular problems encountered with the upstream seat bypass designs include the need to provide dynamic seals due to bi-directional sealing of a ball-to-seat seal and a seat-to-body seal. A necessary consequence of such complicated bi-directional sealing is reduced reliability of such elaborate sealing. Problems of low pressure seat leakage, seat-to-shoulder leakage, compensation for tolerance, sag and wear are not addressed.

Plugging of the bypass routes with contaminants in the valve system fluid frequently occurs, especially where the valve is required to operate in a dirty environment. Where a high viscosity fluid is employed a transient delay is often necessary before pressures equalize about the inlet seat thereby allowing the bypass routes to operate correctly. In both cases this seat design then assumes all the problems of an elementary seat design including a blowing-in bulge and cold flow creep at the non-contained portions of the seat rings.

A recent step in the evolution of ball valve designs comprises the provision of a support ring opposite the disc spring to contain the plastic seat ring. The support ring operates to provide additional seat ring support for bridging the ball passage at valve opening to minimize the blowing-in bulge and the associated reflected distortion on the downstream seat. Additionally, the support ring confines the seat to minimize cold flow creep distortion. However, those seat designs which include disc springs and support rings are not without problems. Specifically, as with the before-mentioned disc spring and plastic seat design, the spring reserve of the seat-spring combination is determined by the spring only which actually must overcome the plastic resistance of the seat in order to move against the ball member and compensate for wear, tolerance and ball sag. The support ring in preventing the seat from caving in also hinders the seat from moving forward against the ball. Thus, the seat is actually obstructed from moving against the ball member by the support ring. While the support ring provides support against seat creep and blow-in bulge it holds back the seat and spring combination from compensating for wear, tolerance, and ball sag. As the valve is cycled and the seats are worn, the disc spring forces must overcome both the elasticity of the seat ring and the rigid support of the support ring to effect seat to ball engagement.

It has, therefore, been desired to develop a ball valve and seat assembly for a floating ball type of valve which could be employed with higher fluid system pressures while producing a longer life span than has heretofore been possible. Preferably, such a design would eliminate the necessity for utilizing a trunnion mounted ball as is generally conventional for ball valves employed in elevated fluid system pressure conditions. Trunnion mountings are not considered practical unless the valve is quite large because such mountings substantially increase the size, complexity and cost of the valves.

The present invention contemplates a new and improved construction which overcomes all of the above referred to problems and others and provides a new and improved floating type ball valve and seat assembly which facilitate increased pressure capabilities and extend the effective valve life and wherein the seats may be formed from a wide variety of materials to suit a wide range of operating conditions or parameters.

BRIEF DESCRIPTION OF THE INVENTION

Generally, the present invention contemplates a new and improved ball valve and seat assembly wherein a seat ring with its own mechanical elasticity is cooperatively disposed with an associated disc spring and a reinforcing ring to sealingly engage a ball member with a substantially uniform stress distribution over a continuous seat ring engaging surface which faces the ball member. A pair of such assemblies are disposed on opposite sides of the ball member and are continuously urged toward the ball for maintaining it properly positioned in a valve body and for providing valve sealing regardless of the fluid system pressure. The even distribution of stress over the seat ring substantially improves wear resistance in either high or low fluid system pressure conditions to prolong the valve life.

More specifically, the subject invention is particularly applicable to use in a valve of the type having a valve body with a central passageway, a ball member positioned in the passageway including a fluid flow opening and being mounted for selective rotation between valve open and closed positions to control fluid flow through the valve and further including a radius of curvature on an outer wall surface. A pair of radially inward extending continuous shoulders are disposed circumferentially of the passageway on opposite sides of and in a facing relationship with the ball member. The passageway includes a pair of counterbores disposed on opposite sides of the ball member with each of the counterbores having a circumferentially continuous inner end wall facing an associated one of the shoulders. A pair of composite seat member assemblies are positioned axially in the passageway on opposite sides of the ball member for fluid sealing engagement with the ball member. Each of the assemblies comprises a reinforcing ring, a spring seat ring and a disc spring. The reinforcing ring includes a central opening, a first surface facing an associated one of the shoulders, a second surface abutting the end wall of the associated counterbore, and a third surface generally facing the ball member in a spaced relationship therefrom. The spring seat ring is adapted for rotational-type flexure generally toward and away from the reinforcing ring. The spring seat ring includes a central opening, a first surface generally facing the associated one of the shoulders, a second surface abutting the reinforcing ring first surface, and a third surface facing the ball member for sealingly engaging the ball member. This third surface is contoured to include a radius of curvature greater than the radius of the ball member in an unstressed, unassembled condition. The disc spring has a generally frusto-conical configuration in an unstressed condition and is interposed between the spring seat ring and an associated one of the shoulders. The ball member and pair of composite seat member assemblies are sized so that when assembled in the valve body central passageway axially between the shoulders, the seat rings are flexed and stressed to have a radius of curvature at the third surfaces thereof generally equivalent to the radius of the ball member. In this manner, substantially the entire extent of the seat ring third surfaces sealingly engage the ball member. Simultaneously, the disc springs are stressed toward a flattened condition for continuously urging the seat ring third surfaces toward ball member sealing engagement.

In accordance with another aspect of the invention, the ball member and pair of composite seat members are sized so that when assembled axially between the shoulders from a preassembly reference position, the seat rings and disc springs are flexed and stressed to have an axial displacement at the central openings thereof equal to an axial spacing of radially innermost ends of the seat ring second surfaces from the ball valve member plus an axial displacement of the disc spring at an equicentric position to the axial spacing.

The principal object of the invention is the provision of a new and improved ball valve and seat assembly which allow higher pressure ratings and greater cycle life to be obtained from a floating ball type of ball valve.

Another object of the present invention is the provision of such a ball valve and seat assembly which will effect valve sealing even at very low fluid system pressures.

Still another object of the present invention is the provision of a new and improved ball valve and seat assembly which permit the seat rings to sealingly engage the ball member over a surface of substantially equal stress distribution.

Still other objects and advantages of the invention will become apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a pair hereof and wherein.

DETAILED DESCRIPTION OF THE PREFERRED EMBODIMENT

Figure 1:
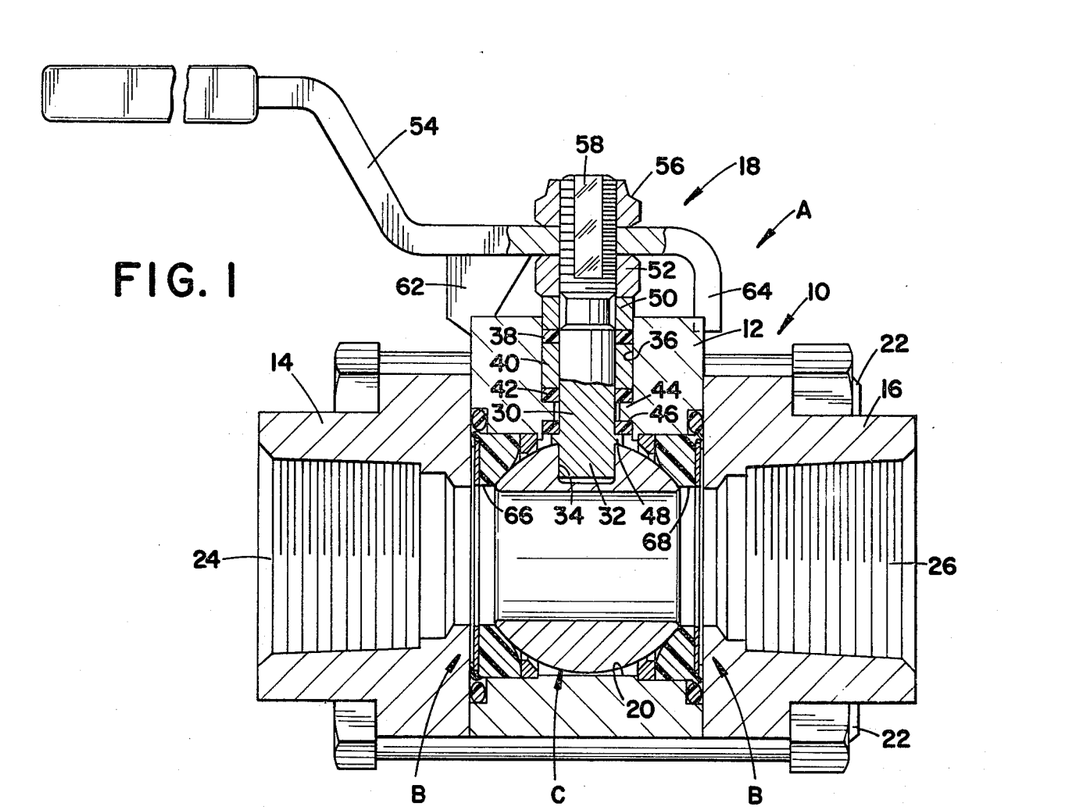
FIG. 1 is a longitudinal cross-sectional view through a ball valve which incorporates the preferred embodiment of the invention.

Referring now to the drawings wherein the showings are for purposes of illustrating the preferred embodiment of the invention only and not for purposes of limiting same, FIG. 1 shows a ball valve A having a pair of opposed seat assemblies B disposed on opposite sides of a floating type spherical ball member C.

Figure 5:
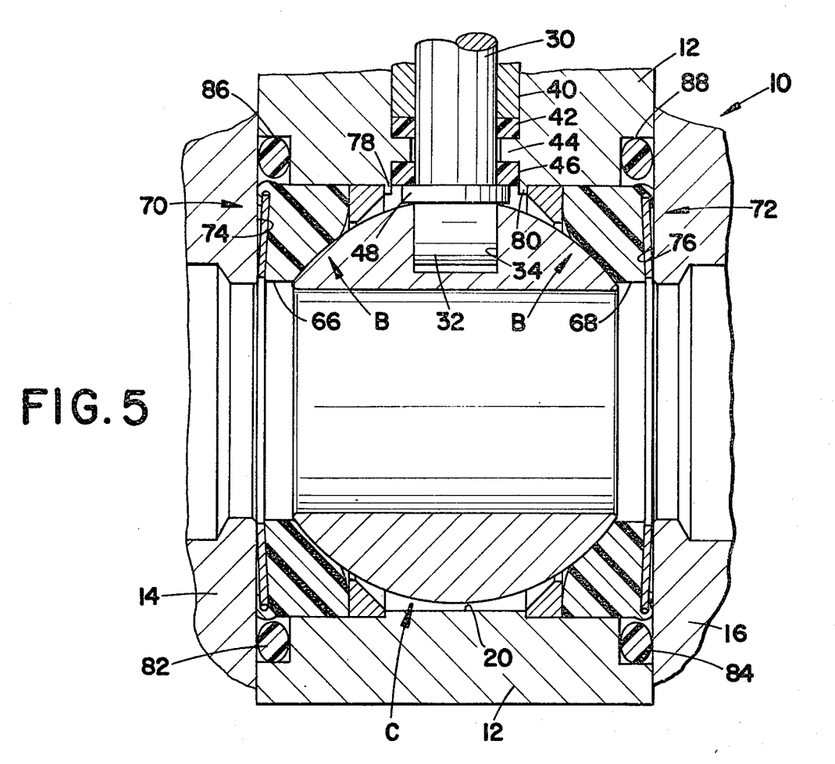
FIG. 5 is a slightly enlarged view of a portion of the valve of FIG. 1 showing the ball member in the valve open position under a no load condition.

More particularly, and with reference to FIGS. 1 and 5, ball valve A includes a body or housing generally designated 10 having a main or central body section 12 and opposed end fittings 14, 16. Seat assemblies B and ball C are mounted within the main body section 12 and the ball member is arranged for selective rotation by a stem and actuating handle assembly generally designated 18.

Figure 8:
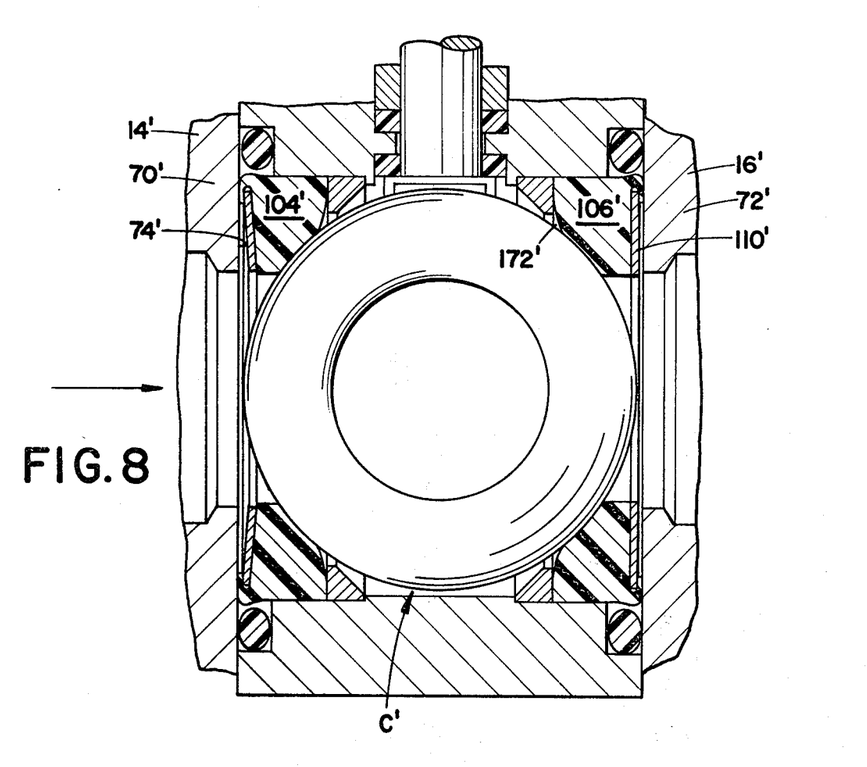
FIG. 8 is a cross-sectional view similar to FIG. 5 but with the valve in a closed position under the influence of elevated fluid system pressures and at such time that the seat assemblies have undergone considerable wear.

The details of all portions of the valve illustrated in FIGS. 1, 5 and 8, except for the ball and seat ring assemblies, may be modified as desired and/or necessary to accommodate different types of styles of ball valve constructions. In general, however, and for purposes of describing the subject invention, the valve body includes a generally cylindrical central passageway or axially extending fluid flow opening 20 which is only slightly larger in diameter than ball member C. Each of end fittings 14, 16 is releasably connected to central body section 12 by a plurality of longitudinally extending tie bolts generally designated 22 (FIG. 1). The end fittings are also provided with internal threads 24, 26 or any other convenient means to accommodate connecting the valve to an associated fluid system or piping.

The stem and actuating handle assembly 18 illustrated includes a stem member 30 having a lower end 32 configured as shown for sliding receipt in a slot or groove 34 included in the upper end of ball C. This arrangement allows the ball to be rotated between valve open and closed positions while at the same time permitting the ball to have some freedom of movement for shifting axially in valve body passageway 20 when the valve is in a closed position and fluid pressure is acting on the ball.

Stem members 30 extends outwardly through an opening 36 in central body section 12. Suitable packing rings 38, 40 and 42 are positioned in opening 36 and sealingly engage the opening and stem member 30. As shown, lower packing ring 42 rests upon an inwardly extending flange 44 formed within opening 36. A split thrust washer 46 is positioned below flange 44 and is clamped thereto by an outwardly extending shoulder or flange 48 formed at the base of stem member 30. The stem is held in position by a packing gland 50 and a packing nut 52. As shown in FIG. 1, tightening of packing nut 52 applies pressure to packing rings 38, 40, 42 to assure a fluid-tight seal about the stem.

Although it is possible to actuate the valve stem by many different types of actuators, including both manual or automatic, a handle member 54 has been shown. This handle is releasably secured to stem member 30 by a nut 56 which clamps the handle to the top of packing nut 52. A cooperating flat 58 is advantageously formed on the exterior of the stem for association with a flat (not shown) in the handle opening for properly positioning the handle on the stem. However, the position of the handle and, in turn, the position of ball member C are limited by depending stop members 62, 64 carried by handle 54. These stop members engage suitable surfaces on central body section 12 to provide fixed stops for the valve in the full open and full closed positions.

With continued reference to both FIGS. 1 and 5, the ball seat arrangement utilized in the subject invention includes a pair of seat ring assemblies B disposed on opposite sides of ball member C. As shown, the seat ring assemblies are clampingly retained in position on opposite sides of the ball adjacent opposite ends of the main body section passageway or opening 20. In the preferred embodiment hereunder discussion, the seat ring assemblies are located substantially equidistantly from and on diametrically opposite sides of the axis of rotation of the ball member and include radially innermost central openings 66, 68. While the seat ring assemblies could be maintained in position by many different or alternative arrangements, they are shown in the preferred embodiment as being located by shoulders 70, 72 defined by end faces 74, 76 of end fittings 14, 16, respectively. The inward limit of movement of the seat ring assemblies is defined by a pair of shoulders or steps 78, 80 (FIG. 5) which are formed by the inner end walls of counterbores extending inwardly of valve body passageway or opening 20. Still further, a seal is provided between central body section 12 and end fittings 14, 16 by means of O-rings 82, 84 which are received in second counterbores 86, 88, respectively. Each O-ring is disposed about the outer circumference or outer peripheral surface of a portion of the associated seat ring assembly B.

The structural details of ball valve A described hereinabove are with reference to the preferred valve construction. It will be readily apparent to those skilled in the art, however, that modifications may readily be made thereto to accommodate particular operational needs and/or requirements. Such changes are not deemed to affect the overall intent or scope of the present invention as will be described in detail hereinafter.

Figures 2, 3:
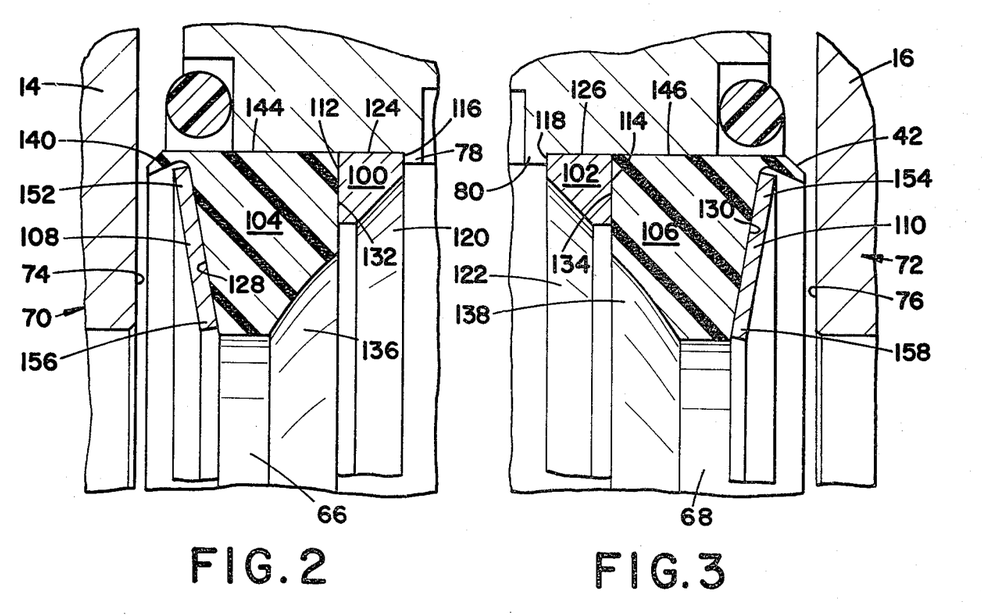
FIG. 2 is an enlarged cross-sectional view of the upstream seat assembly just prior to valve make-up and with the ball member deleted for ease of illustration.
FIG. 3 is an enlarged cross-sectional view of the downstream seat assembly shown just prior to valve make-up and with the ball member deleted for ease of illustration.
Figure 4:
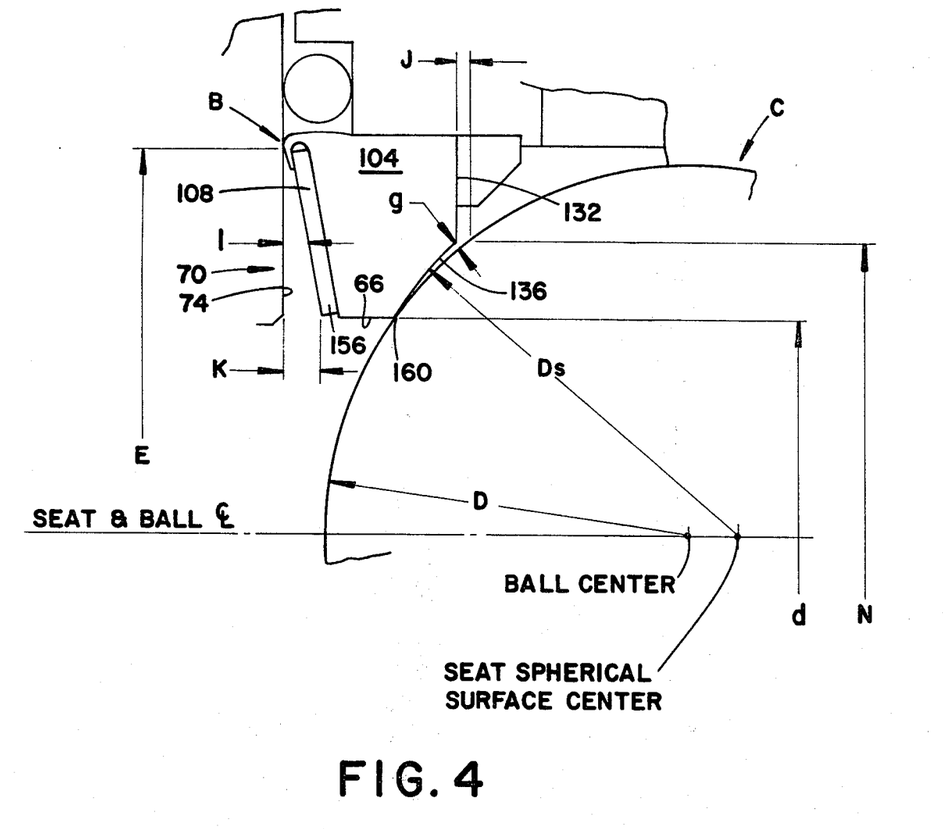
FIG. 4 is a somewhat schematic view of the preferred seat assembly construction shown just prior to valve make-up for showing various cooperative relationships between the valve components.

With reference to FIGS. 2, 3 and 4, description will be made of the specific details of seat assemblies B. FIG.

2 shows a cross-sectional view of the upstream seat assembly disposed adjacent end fitting 14 prior to valve make-up. FIG. 3 shows a cross-sectional view of the downstream seat assembly disposed adjacent end fitting 16 and is identical to the upstream seat assembly. The ball member C has been deleted for ease of understanding and appreciating the seat assembly construction. FIG. 4 shows a somewhat schematic view of a seat assembly just prior to make-up where the ball member C has been included.

The seat assemblies are each preferably comprised of three components, i.e., reinforcing or support rings 100, 102, seat rings 104, 106 and frusto-conical disc springs 108, 110, respectively. Reinforcing rings 100, 102 have an annular configuration including a central opening and are constructed from a rigid material such as steel or other suitable metal. In FIGS. 2 and 3, reinforcing rings 100, 102 are shown as including first circumferentially continuous surfaces or end faces 112, 114 which face associated shoulders 70, 72 of end fittings 14, 16. Second continuous surfaces 116, 118 face and abut counterbore end walls or steps 78, 80 of main body section passageway 20 to positively establish a forwardmost or home position for the reinforcing rings. A third continuous surface 120, 122 of each faces generally toward the ball member (not shown), but is dimensioned to be spaced therefrom in order to prevent any abutment or interference therewith and to inhibit distortion and displacement of the associated seat ring between the reinforcing ring third surfaces 120, 122 and the ball member. The outer circumference or peripheral surfaces 124, 126 of rings 100, 102 are closely disposed to the sidewall of passageway 20. Outer surfaces 124, 126 and second surfaces 116, 118 may alternately include a flange or step configured and dimensioned to engage shoulders 78, 80 to further extend portions of support rings 100, 102 axially inward of passageway 20 where overall valve dimensions may so require. However, such an additional flange is avoided in the preferred embodiment shown to obviate additional machining steps.

Referring still to FIGS. 2 and 3, it will be seen that seat rings 104, 106 also comprise annular or ring-like members having central openings 66, 68 therethrough which are smaller in size than the central openings of the reinforcing rings 100, 102. The seat rings are adapted for flexure generally toward and away from the reinforcing rings 100, 102. Seat rings 104, 106 are configured to exert a spring-like mechanical elasticity against the ball member. First surfaces 128, 130 generally face the associated shoulders 70, 72 of end fittings 14, 16 and, in relation to shoulders 70, 72, are inclined or tapered away from end faces 74, 76 at an unstressed and unflexed condition. Seat ring second surfaces 132, 134 face reinforcing rings 100, 102 for bearing engagement and support against reinforcing ring first surfaces 112, 114. Seat ring third surfaces or ball engaging surfaces 136, 138 generally face ball member C for fluid sealing engagement with the ball. Flanges or lips 140, 142 extend axially outward of seat ring first surfaces 128, 130 at outer peripheral surfaces 144, 146. These lips or flanges are preferably continuous about the seat rings and located so that their radial inner surfaces generally correspond to the outside diameter of conical disc springs 108, 110. Flanges or lips 140, 142 are bevelled at the radial outermost areas thereof and are slightly rolled over the radial outer edges of the disc springs in the manner shown. While not necessary, this arrangement advantageously maintains the seat rings and disc springs together as a subassembly.

In the preferred arrangement of the invention, seat rings 104, 106 are constructed from a resilient plastic material such as polytetrafluroethylene, polyethylene, or the like. It should be readily appreciated, however, that other types of material such as acetyl resins and the like could also be advantageously utilized. The particular material chosen will, to some extent, be dependent upon the operating conditions to which the valve will be subjected.

Frusto-conical disc springs 108, 110 include outer ends 152, 154 and inner ends 156, 158. The diameter at each outer end is such that a disc spring may be received within the cylindrical cavity defined by the inner wall of the seat ring axial flanges 140, 142 and first surfaces 128, 130. The inner diameter of each spring at ends 156, 158 is substantially equal to the diameter of the opening 66, 68 through the associated seat ring 104, 106.

The disc springs are selected so that their force is sufficient under partial deflection to continuously urge the seat rings toward the ball. The springs must also allow stressing or compression thereof toward a flattened condition to accommodate ball shifting and engagement with seat ring third surfaces 136, 138. In the preferred embodiment here under discussion, seat ring first surfaces 128, 130 are configured so as to substantially fully stress disc springs 108, 110 at valve make-up, ie., move the disc springs from a frusto-conical shape toward a substantially flattened configuration.

With reference to FIG. 4, the particular dimensional relationships between each seat assembly B and ball member C will be specifically discussed. Seat assemblies B will be discussed with particular reference to the upstream seat assembly disposed at end fitting 14. It should be appreciated that the downstream seat assembly disposed at end fitting 16 is identical thereto unless otherwise specifically noted. FIG. 4 is a schematic representation of seat assembly B and ball member C just prior to make-up at a preassembly reference position. In this reference position, disc spring 108 and seat ring 104 are relaxed and contact is made between seat ring 104 and ball C at an annular contact line 160 disposed at the radial innermost end of seat ring third or ball engaging surface 136.

It is a particular feature of the invention that seat ring 104 engages ball member C at assembly such that a substantially uniform stress distribution occurs along the entire extent of the seat ring third surface 136. Since seat ring 104 is configured to exert a spring-like mechanical elasticity against the ball member C at assembly independently of disc springs 108, 110, the arcuate contour of ball engaging surface 136 must be configured to distort in a predictable and controlled manner for accomplishing the uniform stress distribution objective. It has been found that in order to obtain this objective, the radius of curvature of surface 136 in an unstressed, unassembled condition must be greater than the radius of curvature on the outer wall surface of the ball member C. In addition, the seat ring 104 and disc spring 108 are sized so that when assembled axially between valve body shoulder 70 and ball member C, the seat ring is flexed outwardly towards associated shoulder 70 and stressed to have a radius of curvature at surface 136 generally equivalent to the radius of the ball member, thus sealingly engaging the ball member over the entire extent of the surface 136. The disc spring 108 is simultaneously stressed toward a flattened condition and, therefore, additionally acts to continuously urge seat ring third surface 136 toward engagement with the ball member. Such a uniformly stressed, full surface engagement will occur when the ball member C and composite seat members B are sized so that at valve assembly from the preassembly reference position of FIG. 4, the seat ring 104 and disc spring 108 are flexed and stressed to have an axial displacement at the area of seat assembly central opening 66 equal to an axial spacing of a radial innermost end of seat ring second surface 132 from the ball valve member C plus an axial displacement of the disc spring 108 from shoulder end face 74 at an equicentric position to the axial spacing.

In other words, and with continued reference to FIG. 4, seating surface 136 contorts to match the spherical surface of the ball where dimension k is equal to the sum of dimension l plus dimension j. Dimension k represents the axial displacement at central opening 66 comprising a displacement of disc spring inner end 156 toward the end face 74 of shoulder 70. Dimension j represents the axial spacing of the radially innermost end of seat ring second surface 132 from the ball member C. Dimension l represents the axial displacement of disc spring 108 from end face 74 of shoulder 70 at an equicentric position to the radially innermost end of seat ring second surface 132.

Recognizing this axial spacing or relationship, the relaxed seat ring spherical surface diameter $D_s$ and the radial gap, dimension g, between ball member C and the seat ring at the radially innermost end of second surface 132 may be calculated given certain readily determinable dimensions of the ball valve A. More specifically, the radial gap and the relaxed seat ring spherical surface diameter $D_s$ can be determined using known geometrical methods, given the seat ring 104 inside diameter, dimension d; the ball member diameter, dimension D; the outside diameter of the seat ring ball engaging surface 136 or radially innermost end of second surface 132, dimension N; the outside diameter of the disc spring 108, dimension E; and, the relaxed composite seat taper, dimension k, which is typically determined from the relaxation of the seat ring 104 and disc spring 108 necessary to compensate for the expected seat wear. These dimensions are typically given parameters determined by the size of the valve which is desired and are determined according to conventional industry design standards. There is a unique spherical diameter $D_s$ and a unique seat-to-ball radial gap g for each seat ring 104, 106 corresponding to each set of given valve parameters, D, d, N, E, and k, such that when the seat ring 104, 106 is deformed upon assembly, the seat ring engaging surface 136, 138 conforms to the spherical surface of the ball member C.

In the preferred embodiment of the invention as shown in FIGS. 2 and 3, seat assemblies B are configured so that at the preassembly reference position, frusto-conical disc springs 108, 110 and seat rings 104, 106 have their smaller diameter ends more closely spaced toward the ball member. With reference to the upstream seat assembly of FIG. 2, the extent of the taper at the disc spring inner end 156 is predetermined to be a dimensional amount corresponding to the expected wear on the downstream seat ring 106 (FIG. 3) over the cycle life of the valve. The first surface 128 of seat ring 104 tapers in matable association with disc spring 108. The seat ring second surface 132 is disposed for close abutting engagement to the first or bearing surface 112 of the reinforcing ring 100. As best illustrated in FIG. 4, and in the preassembly reference position, the seat ring third or ball engaging surface 136 is arcuately contoured to have a spherical surface diameter slightly greater than the ball member diameter and axially offset therefrom. The radially innermost end of the engaging surface 136 contacts the ball member C at an annular contact line 160 with a ball clearance gap thus being included at the radially outermost end of ball engaging surface 136.

OPERATION

Referring to FIGS. 5–10, description will hereinafter be made with reference to operation of the new ball valve and seat assembly. FIG. 5 shows the valve in a fully assembled, valve open position (no load fluid pressure condition). In this position the two seat assemblies B have been shifted from the unstressed condition shown in FIGS. 2–4 to a fully stressed condition. Sizing of the ball member C, seat assemblies B and shoulders 70, 72 are such as to provide this relationship at ball valve assembly or make-up.

Figure 6:
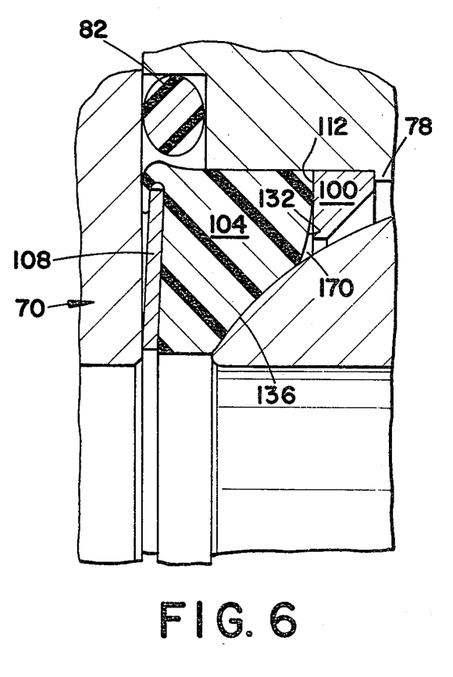
FIG. 6 is an enlarged cross-sectional view of a portion of the upstream seat assembly of the valve shown in FIG. 5.
Figure 7:
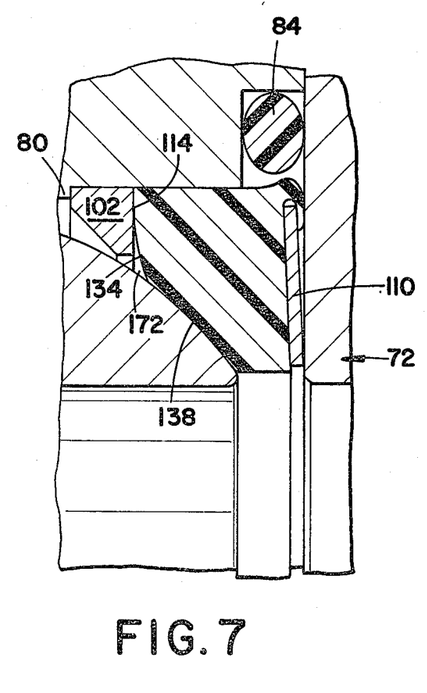
FIG. 7 is an enlarged cross-sectional view of a portion of the downstream seat assembly of the valve shown in FIG. 5.

More particularly, and with particular reference to FIGS. 5–7, the seat assemblies are disposed at an assembled condition such that opposed seat rings 104, 106 are compacted between the associated reinforcing rings 100, 102 and disc springs 108, 110 to compress the seat rings. The seat rings 104, 106 are further rotatably flexed at valve make-up away from each other and towards associated shoulders 70, 72 generally about their outer peripheries and against disc springs 108, 110 in response to engagement between ball engaging surfaces 136, 138 and ball member C. This action compresses the associated disc springs 108, 110 toward a substantially flattened condition. In the position of FIGS. 6 and 7, the disc springs 108, 110 are preferably deflected through a travel distance (dimension k in FIG. 4) predetermined by the reasonable expectancy of wear on the downstream seat ring 106 over the cycle life of the valve A.

The combination flexure of the seat rings 104, 106 and the disc springs 108, 110 provides a composite spring seat ring assembly which has four principal advantages. The first is to provide a controlled preload of the seating surfaces against the ball. Since some loading is necessary to maintain a seal, most prior art ball valves accomplish the preload by crushing the seat rings between the ball and the flange or shoulder at assembly which, in effect, clamps the ball against movement. With seat rings constructed of harder plastic materials, this resulted in an unacceptably high operating torque. The controlled preload of the present invention, however, provides a seat surface against the ball in response to a flexing action rather than a crushing action and thereby offers a reasonable operating torque. Second, the seat ring and disc spring combinations operate to maintain a fluid seal at low seat pressures. Without spring loading of the seat rings against the ball, the seats are more likely to leak at low pressures, i.e., when pressure loading against the ball is less. Thirdly, a seal which compensates for seat wear and manufacturing tolerance is provided. As the seats wear during valve operation, the seat composites relax against the ball, thereby extending the leak tight cycle life. Fourthly, the combination flexure resists the problem of ball sag which may deform the seats by the forces of ball member weight.

If the only spring action were provided by the disc springs with no additional spring action being provided in the seat rings, the disc springs would have to overcome the elasticity of the seat rings in order to flex them against the ball for wear compensation purposes.

Upon assembly, the disc spring and seat ring composite assemblies of the present invention are largely flattened and flexed away from the support rings, i.e., seat ring second surfaces 132, 134 are flexed away from portions of the reinforcing ring first surfaces 112, 114. Such action provides flexure reserve gaps 170, 172 to accommodate seat ring and disc spring relaxation while simultaneously maintaining a preload against ball member C.

Five principal advantages are provided by reinforcing rings 100, 102 in combination with the disc springs and seat rings of the present invention.

The first is that they operate to reduce the seat stress on the downstream seat ring 106. Without the rings 100, 102, pressure behind the upstream seat ring 104 over an effective pressure area out to counterbore step 78 imparts a load on the downstream seat ring 106 and disc spring 110. With the inclusion of an upstream reinforcing ring 100, the effective pressure area of load translated to the downstream seat ring is reduced by the additional surface area of reinforcing ring first surface 112 which supports and reinforces upstream seat ring 104 against load pressures. The reduced load on the downstream seat ring 106 in a valve closed position provides reduced seating area stress and, consequently, reduced seat wear to extend the leak tight cycle life of the valve.

Secondly, the support ring 100 operates to support the upstream seat 104 against caving in under pressure. In prior systems lacking the upstream reinforcing ring 100, the upstream seat ring 104 can cave in under a long duration static load. Thirdly, during cycling as the ball engaging surface 136 partially spans the ball opening while maintaining ball sealing engagement, the upstream reinforcing ring 100 supports the seat ring 104 to prevent a blowing-in bulge. An upstream cave-in or blow-in bulge of the seat ring 104 immediately upsets the sealability of the downstream seat assembly.

Because of these aforementioned advantages the upstream reinforcing ring 100 retains the seat ring 104 such that the allowable pressure on the seat ring can be increased over that allowable pressure which is permissible when a reinforcing ring is not present.

Fourthly, the downstream support ring 102 also provides a positive stop against which the second surface 134 of seat ring 106 can form a flange-seat posterior seal. Most conventional seat ring materials readily crush upon assembly between the disc spring and the counterbore step or flange 80. Without the support ring 102, the seat 106 can too readily slip beyond this thin flange in the body of the valve. Particularly with hard plastics such as polyethylene, a more positive stop is necessary to effect a posterior seal.

An additional, fifth advantage of reinforcing rings 100, 102 resides in retarding back creep of the seat rings 104, 106 and particularly, the downstream seat ring 106. The ball member C, at a valve closed position with a load acting against the upstream seat assembly and without a downstream support ring 102, more readily displaces the downstream seat ring 106 toward the center of the valve body, especially if the seat material is polytetrafluoroethylene or the like. Such displacement or creep acts to relieve the seating surface preload necessary to maintain an effective seal.

It should be noted that even though the present invention encompasses a floating ball design, ball member C does not necessarily axially shift or float toward the downstream seat assembly to effect a downstream seat seal in a valve closed and loaded condition. Since the downstream disc spring 110 is substantially flattened against shoulder 72 at assembly, the downstream seat ring 106 is substantially contained on all four sides and the force against the ball engaging surface 138 is evenly distributed over the entirety of that surface. The loading force does not distort seat ring 106 to allow an axial shift of ball member C downstream to effect a principal seal at the downstream seat ring. Rather, the invention encompasses a seat ring seal at both the upstream and downstream seat assemblies throughout the life of the ball valve. However, even after excessive wear to the downstream seat ring may have caused a break in the upstream seal, the subject ball valve will not fail as the downstream seat assembly will still effect a seal.

Figure 9:
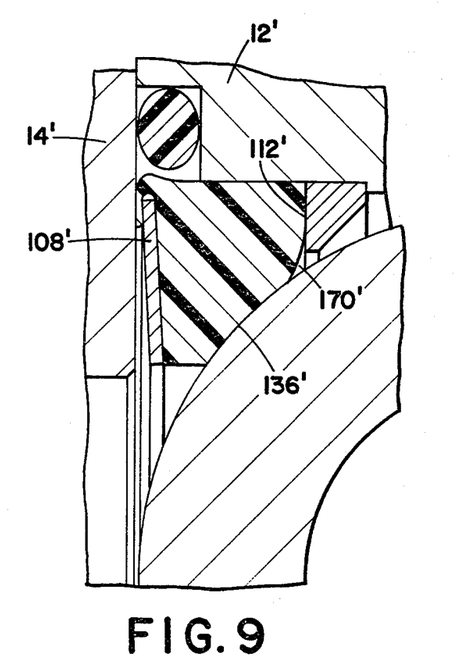
FIG. 9 is a enlarged cross-sectional view showing a portion of the upstream seat assembly of the valve shown in FIG. 8; and, FIG. 10 is an enlarged cross-sectional view of a portion of the downstream seat assembly of the valve shown in FIG. 8.
Figure 10:
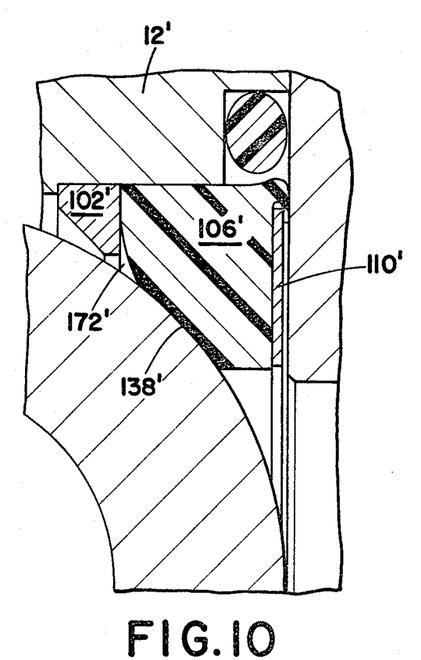

With reference to FIGS. 8, 9 and 10, a ball valve A' which has undergone considerable wear at the downstream seat assembly associated with end fitting 16' is illustrated in a valve closed position under elevated fluid pressure conditions with the direction of fluid flow being designated by the arrow adjacent the valve inlet. As is there shown, ball member C' is forced in response to fluid pressure to shift axially toward shoulder 72 and against the downstream seat ring assembly such that disc spring 110' remains substantially flattened. Due to the substantial wear of seat ring 106', gap 172' is expanded accordingly. Ball engaging or third surface 138' of downstream seat ring 106' remains in sealing engagement with the surface of the ball member C' to provide a fluid-tight seal with equal stress distribution across the extent of surface 138'.

The upstream seat assembly associated with end fitting 14' is flexed toward the direction of movements of the ball member and is partially relaxed from its initially assembled condition to accommodate the wear of downstream seat ring 106' while maintaining a fluid-tight seal with the surface of the ball member C'. Disc spring 108' is relaxed from a substantially flattened condition to the extent required to compensate for the downstream seat ring wear. Upstream seat ring 104' has also relaxed to a similar extent to partially close flexure reserve gap 170' against the first surface 112' of the upstream reinforcing ring 100'. Because of the rotational flexing of seat ring 104', the seat ring second surface 132' is moved toward a contacting relationship with the first surface of reinforcing ring 100'. The ball engaging surface 136' of upstream seat ring 104' remains in substantial sealing engagement with the surface of the ball member C'. The ball deforms a radially innermost portion of surface 136' so that at least that portion has a spherical conformation in mating engagement with the ball member. When the valve A' of FIG. 8 is placed in the valve open position, ball C' will shift axially back towards end fitting 14' such that equal pressure will be exerted on the ball member by the disc springs 108', 110'.

The ball valve A with seat assemblies B described in detail hereinabove is deemed to provide a substantial improvement over those arrangements previously known in the art. The subject design permits the seat assemblies to be flexible and deflect in a predictable and controlled manner at initial assembly to facilitate compensation for seat wear, manufacturing tolerances and ball sag, and to provide a controlled preload for improved ease of operation and low pressure sealing. The ball engaging surfaces of the seat ring assemblies are proportioned and configured for distorting to matable sealing engagement with the ball surface at assembly for providing equal stress distribution across the entire extent of surfaces 136, 138. The inclusion of support rings 100, 102 in combination with the improved seat rings 104, 106 and disc springs 108, 110 prevents the problems of blowing-in bulge, seat cave-in, high downstream seat stress and back creep and posterior seat-to-shoulder leakage, and simultaneously does not inhibit the operational advantage of the seat ring and disc spring combination.

Other modifications not specifically shown in the drawings may be readily incorporated into seat ring assemblies B without in any way departing from the overall invention. It may, for example, be desirable to slightly modify the relative dimensional characteristics between the seat rings, reinforcing rings and disc springs to accommodate particular operational requirements.

The invention has been described with reference to a preferred embodiment. Obviously, modifications and alterations will occur to others upon a reading and understanding of this specification. It is our intention to include all such modifications and alterations insofar as they come within the scope of the appended claims or the equivalents thereof.

Having thus described the invention, we now claim:
1. A ball valve comprising:
   a body having a central passageway;
   a ball member including a fluid flow opening therethrough, said ball member being positioned in said passageway and mounted for selective rotation between valve open and closed positions to control fluid flow through said valve, said ball member further including a radius of curvature on an outer wall surface;
   a pair of radially inward extending continuous shoulders in said passageway disposed circumferentially thereof on opposite sides of said ball member;
   a pair of radially inward extending counterbores in said passageway disposed on opposite sides of said ball member, each of said counterbores having an inner end wall and being circumferentially continuous; and,
   a pair of composite seat member assemblies positioned axially in said passageway on opposite sides of said ball member for fluid-sealing engagement with said ball member, each of said pair comprising:
   a reinforcing ring including a central opening, a first surface facing an associated one of said shoulders, a second surface abutting an associated one of said counterbore end walls and a third surface generally facing said ball member in a spaced relationship therefrom;
   a seat ring adapted for elastic flexure generally toward and away from said reinforcing ring and including a central opening, a first surface generally facing said associated one of said shoulders, a second surface abutting said reinforcing ring first surface, and a third surface facing said ball member for sealing engagement with said ball member outer wall surface, said seat ring third surface being contoured and having a radius of curvature in an unstressed, unassembled condition greater than said radius of said ball member; and,
   a disc spring having a central opening and a generally frusto-conical configuration in an unstressed condition interposed between said seat ring and said associated one of said shoulders;
   said ball member and pair of composite seat member assemblies being sized so that when assembled axially between said shoulders, each seat ring is flexed away from an associated reinforcing ring and stressed to have a radius of curvature at said seat ring third surface generally equivalent to said ball member radius of curvature and is disposed in sealing engagement with said ball member over the extent of said seat ring third surface, each disc spring being stressed toward a flattened condition for continuously urging the third surface of the associated seat ring toward engagement with said ball member.

2. The valve as defined in claim 1 wherein said ball member and pair of composite seat member assemblies are sized so that when assembled from a preassembly reference position, the seat ring and disc spring of each assembly are flexed and stressed to have an axial displacement at said central openings thereof equal to an axial spacing of a radially innermost end of said seat ring second surface from said ball member plus an axial displacement of said disc spring at an equicentric position to said axial spacing.

3. The valve as defined in claim 2 wherein said disc spring axial displacement at the central opening thereof comprises a displacement of said disc spring toward said associated one of said shoulders.

4. The valve as defined in claim 2 wherein the center of said relaxed spherical surface diameter is offset from the center of said ball member.

5. The valve as defined in claim 4 wherein said relaxed spherical surface center is axially offset from said center of said ball valve member.

6. The valve as defined in claim 1 wherein said body includes a removable end fitting which defines one of said shoulders.

7. The valve as defined in claim 1 wherein said seat rings each include an axially extending circumferential flange at the first surface thereof for locating the associated disc spring relative thereto.

8. The valve as defined in claim 1 wherein the central openings in each disc spring and associated seat ring are substantially equal in size and smaller than the central opening in the associated reinforcing ring.

9. The valve as defined in claim 1 wherein said ball member is axially movable in said passageway when said valve is in said closed position to accommodate ball member shifting toward one of said shoulders in response to fluid pressure, the seat ring associated with the other of said shoulders being flexed toward the direction of movement of said ball member in cooperation with the influence of its associated disc spring in order that the third surface thereof will be urged toward continuous contact with said ball member.

10. The valve as defined in claim 9 wherein flexure of said seat rings comprises a rotational type flexure.

11. The valve as defined in claim 1 wherein said seat rings are constructed from a resilient material.

12. The valve as defined in claim 1 wherein each seat ring is compacted between the associated reinforcing ring and disc spring to compress said seat ring.

13. The valve as defined in claim 1 wherein said reinforcing ring first surfaces are configured to provide a rigid bearing surface for said seat rings.

14. The valve as defined in claim 13 wherein each reinforcing ring is spaced from said ball member to an extent which precludes abutment with said ball member and which inhibits distortion and displacement of the associated seat ring between the reinforcing ring third surface and said ball member.

15. In a ball valve of the type including a valve body having a generally cylindrical fluid flow passageway; a ball member disposed in said passageway mounted for selective rotation between valve opened and closed positions with said ball member being shiftable generally axially in said passageway at least when said valve is in said closed position under fluid pressure conditions; a pair of annular seat rings disposed in said passageway on opposite sides of said ball member between said ball member and associated valve body shoulders; a pair of annular disc springs interposed between each seat ring and the associated shoulder for continuously urging said seat rings toward sealing engagement with said ball member; and a pair of annular reinforcing rings positioned in said passageway on opposite sides of said ball member axially inward of said seat rings to provide a rigid bearing surface for the associated seat ring, the improvement comprising:

each seat ring having a configuration wherein upon assembly of said ball valve, said seat ring is rotatably flexed about its outer periphery generally away from its associated reinforcing ring such that a continuous surface of said seat ring facing said ball member is directed into continuous sealing engagement to said ball member and a flexure reserve gap of said seat ring is provided intermediate of a portion of said rigid bearing surface and said seat ring.

16. The improvement as defined in claim 15 wherein said continuous surface has an arcuate contour in a relaxed condition defined by a radius greater than a radius of said ball member, said continuous surface having an arcuate contour in an assembled and flexed condition defined by a radius generally equivalent to said ball member radius.

17. The improvement as defined in claim 15 wherein said ball member is axially shifted in said passageway toward one of said valve body shoulders in response to fluid pressure acting thereon in said valve closed position, said seat ring associated with the other of said valve body shoulders being relaxed toward said one shoulder for maintaining contact with said ball member.

18. The improvement as defined in claim 15 wherein each seat ring is compacted between an associated one of said reinforcing rings and an associated one of said disc springs, said disc springs being compressed to a substantially flattened configuration at least at initial valve assembly.

19. In a ball valve of the type including a valve body having a generally cylindrical fluid flow passageway; a ball member disposed in said passageway mounted for selective rotation between valve opened and closed positions with said ball member being shiftable generally axially in said passageway at least when said valve is in said closed position under fluid pressure conditions; a pair of annular seat rings disposed in said passageway on opposite sides of said ball member between said ball member and associated valve body shoulders; a pair of annular disc springs interposed between each seat ring and the associated shoulder for continuously urging said seat rings toward sealing engagement with said ball member; and a pair of annular reinforcing rings positioned in said passageway on opposite sides of said ball member axially inward of said seat rings to provide a rigid bearing surface for the associated seat ring, the improvement comprising:

each seat ring having an outer periphery in abutting engagement to a side wall of said fluid flow passageway, a first surface facing an associated one of said pair of annular disc springs, a second surface facing an associated one of said pair of annular reinforcing rings, and a third surface facing said ball member having, at a pre-assembly reference position, a radius of curvature greater than a radius of curvature of an outer wall surface of said ball member and being spaced by a radial gap at a radially innermost end of said second surface from said ball member, and having, at assembly, a radius of curvature substantially the same as said radius of curvature of said ball member and matingly engaging said ball member over the extent of said third surface, said seat ring second surface further being spaced, at assembly, from a portion of said reinforcing ring first surface to provide a flexure reserve gap for said seat ring.

20. The improvement as defined in claim 19 wherein said seat ring, in moving from said pre-assembly reference position towards said assembly position, is flexed about said outer periphery and urged into sealing engagement with said ball member at said third surface.

* * * * *